United States Patent
Delisle et al.

[11] Patent Number: 5,905,824
[45] Date of Patent: May 18, 1999

[54] TEMPERATURE COMPENSATED INSENSITIVE OPTICAL MULTIPLEXOR/DEMULTIPLEXOR

[76] Inventors: Vincent Delisle, 1375 Prince of Wales Drive, Apt. 1010, Ottawa, Ontario, Canada, K2C 3L5; Neil Teitelbaum, 834 Colonel By Drive, Ottawa, Ontario, Canada, K1S 5C4

[21] Appl. No.: 08/987,642

[22] Filed: Dec. 9, 1997

[51] Int. Cl.⁶ ........................................ G02B 6/26
[52] U.S. Cl. ........................................... 385/15
[58] Field of Search ................... 369/44.12, 112; 385/14, 8, 9, 132, 145, 24, 27, 11, 130; 359/118, 127; 250/227.14; 356/345

[56] References Cited

U.S. PATENT DOCUMENTS

| | | | |
|---|---|---|---|
| 5,031,983 | 7/1991 | Dillon, Jr. et al. | 385/11 |
| 5,276,743 | 1/1994 | Penner et al. | 385/14 |
| 5,390,157 | 2/1995 | Revelli, Jr. | 385/14 |
| 5,852,505 | 12/1998 | Li | 385/24 |

*Primary Examiner*—Akm E. Ullah
*Attorney, Agent, or Firm*—Neil Teitelbaum & Associates

[57] ABSTRACT

An optical device comprising a planar waveguide, and a second portion spaced from the planar waveguide portion by a gap to receive optical signals therefrom, the planar waveguide portion including: means integrated therein for separating an input beam into sub-beams having different central wavelengths; the second portion having closely spaced waveguides for receiving the sub-beams of light and having passive temperature compensation means coupled therewith for enhancing the coupling of the optical signals having predetermined wavelengths provided by the first block with the closely spaced waveguides.

26 Claims, 2 Drawing Sheets

TEMPERATURE COMPENSATED INSENSITIVE OPTICAL MULTIPLEXOR/DEMULTIPLEXOR

FIELD OF THE INVENTION

This invention relates generally to planar waveguides used to carry optical signals between optical devices, and more particularly, this invention relates to an optical waveguide device wherein passive components are utilized for routing and distributing optical transmissions.

BACKGROUND OF THE INVENTION

In wavelength division multiplexed optical communication systems, many different optical wavelength carriers provide independent communication channels in a single optical fiber. Future computation and communication systems place ever-increasing demands upon communication link bandwidth. It is generally known that optical fibers offer much higher bandwidth than conventional coaxial communications; furthermore a single optical channel in a fiber waveguide uses a microscopically small fraction of the available bandwidth of the fiber (typically a few GHz out of several tens of THz). By transmitting several channels at different optical wavelengths into one fiber (i.e., wavelength division multiplexing, or WDM), this bandwidth may be more efficiently utilized.

There have been many attempts to develop a compact, high-resolution waveguide demultiplexor or spectrometer for application in areas such as spectroscopy, optical networks and optical links and more particularly optical communication systems. Such a demultiplexor can be extremely critical in wavelength division multiplexing (WDM) links. In these links or networks, each channel is assigned a distinct and unique wavelength for data transmission. Thus, the optical fiber that connects channels in a WDM network carries many discrete wavelength channels and a particular wavelength is selected before the data is received. The data reception can be achieved by combining a wavelength demultiplexor, photodetectors and electronic selection circuitries. In WDM links, many wavelengths are multiplexed and transmitted through a single optical fiber to increase the capacity of the fiber. The receiver must demultiplex the many wavelengths and select the proper channel for reception. In these applications, the requirements on the wavelength demultiplexor are typically: an optical bandwidth>30 nm, a wavelength resolution of a few angstroms, polarization insensitivity, compactness, low loss, low crosstalk, and a low manufacturing cost.

At present, there are many known methods of selecting particular wavelengths, however, none are ideal for the applications outlined above.

Techniques for multiplexing and demultiplexing between a single optical fiber comprising the multiplexed channel and plural optical fibers comprising the plural demultiplexed channels are described in various U.S. patents. For example, multiplexing/demultiplexing with birefringent elements is disclosed in U.S. Pat. Nos. 4,744,075 and 4,745,991. Multiplexing/demultiplexing using optical bandpass filters (such as a resonant cavity) is disclosed in U.S. Pat. Nos. 4,707,064 and 5,111,519. Multiplexing/demultiplexing with interference filters is disclosed in U.S. Pat. Nos. 4,474,424 and 4,630,255 and 4,735,478. Multiplexing/demultiplexing using a prism is disclosed in U.S. Pat. No. 4,335,933. U.S. Pat. No. 4,740,951 teaches a complex sequence of cascaded gratings to demultiplex plural optical signals. U.S. Pat. Nos. 4,756,587 and 4,989,937 and 4,690,489 disclose optical coupling between adjacent waveguides to achieve a demultiplexing function. A similar technique is disclosed in U.S. Pat. No. 4,900,118. Although some of these techniques are better than others, there is a need for a system that is compact and which does not rely on bulk grating elements that is relatively inexpensive to manufacture and that is provides reasonable precision.

Optical switching, multiplexing and demultiplexing has been accomplished for nearly a decade by using an interconection apparatus having a plurality of closely spaced waveguides communicating with an input star coupler. The output of the star coupler communicates with a second star coupler via an optical grating consisting of an array of optical waveguides. Each of the waveguides differs in length with respect to its nearest neighbour by a predetermined fixed amount. The ouputs of the second star coupler form the outputs of the switching, multiplexing and demultiplexing apparatus. See for example U.S. Pat. No. 5,002,350 in the name of Dragone, issued Mar. 25, 1991.

In operation when each of a plurality of separate and distinct wavelengths are launched into a separate and distinct input port of the apparatus, they will all combine and appear on a predetermined one of the output ports. In this manner, the apparatus performs a multiplexing function. The same apparatus may also perform a demultiplexing function. In this situation a plurality of input wavelengths is directed to a predetermined one of the input ports of the apparatus. Each of the input wavelengths is separated from the other and directed to a predetermined one of the output ports of the apparatus. An appropriate selection of the input wavelength also permits switching between any selected input port to any selected output port.

The grating located between the two star couplers essentially consists of an array of curved waveguides of different lengths. The waveguides are closely spaced at their ends, whereas they are widely spaced and strongly curved in the central region. The order of the grating is determined by the difference in length between the adjacent waveguides. U.S. Pat. No. 5,243,672 also in the name of Dragone, issued Sep. 7, 1993 describes an improved method of making such a grating with an improved bend radius. Cohen et al. in U.S. Pat. No. 5,440,416 describes a similar grating wherein reflection is utilized and the structure is cut in half.

Although each of these patents has it merits and describes working devices, the performance of all of these devices is susceptible to temperature variations. One standard means for stabilizing the output of such devices is to actively control the temperature about these devices. Thus, control circuits with heating elements are provided to ensure a stable temperature environment. Of course, there are limits to such control; and furthermore, these devices generally consume considerable power.

Currently these phase array wavelength division multiplexors are fabricated on a monolithic glass slab, wherein waveguides and a transformation region are disposed means integrated therein for separating an input beam into sub-beams having different central wavelengths; said second portion having closely spaced waveguides for receiving the sub-beams of light and having passive temperature compensation means coupled therewith for enhancing the coupling of the optical signals having predetermined wavelengths provided by the first block with the closely spaced waveguides.

It is an advantage of the present invention that optical coupling of light within a free space region of a phased array demultiplexer to one or more waveguides can be enhanced without significant energy requirements for temperature control. It is a further advantage that coupling can be enhanced using a passive system requiring no additional energy.

Further advantages will be apparent to persons of skill in the art with reference to the following description of preferred embodiments, and to the drawings.

BRIEF DESCRIPTION OF THE DRAWINGS

Exemplary embodiments of the invention will now be described in conjunction with the drawings, in which.

Like numerals are used throughout to denote like elements. within the glass. However, one known problem with these devices is that a wavelength shift with a change in temperature occurs, and waveguides designed to couple with and receive particular wavelengths may couple with other wavelengths or may not couple with an intended wavelength efficiently.

It is an object of this invention, to compensate for shifts in wavelength caused by a change in temperature. This solution requires little or no external power. In accordance with this invention, a device is provided comprising:

a first monolithic waveguide block, and a second monolithic waveguide block spaced from the first block to receive optical signals therefrom, said first monolithic waveguide block including:
means integrated therein for separating an input beam into sub-beams having different central wavelengths;
said second monolithic waveguide block having closely spaced waveguides for receiving predetermined wavelengths of light corresponding to at least some of the sub-beams of light, one of the second monolithic waveguide block and the first block having temperature compensation means coupled therewith for coupling of the predetermined wavelengths of light provided by the first block with predetermined waveguides of the closely spaced waveguides, such that predetermined waveguides are for receiving predetermined wavelengths of light, said temperature compensation means for effecting a relative displacement between the closely spaced waveguides and the position of the sub-beams corresponding to the predetermined wavelengths of light and the position of the sub-beams corresponding to the predetermined wavelengths of light changes with a change in temperature, to more efficiently couple the predetermined wavelengths of light with predetermined waveguides.

In accordance with the invention there is further provided, an optical device comprising:

a planar waveguide portion, and a second portion spaced from the planar waveguide portion by a gap to receive optical signals therefrom, said planar waveguide portion including:

DETAILED DESCRIPTION

Figure 1:
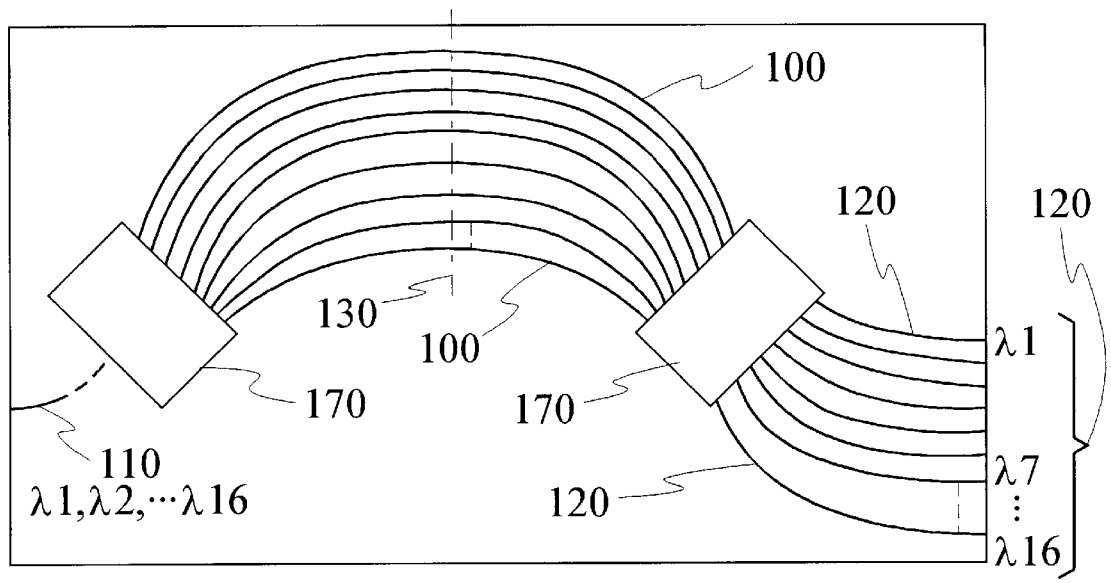
FIG. 1 is a schematic drawing of a multichannel WDM made according to silicon optical bench techniques of the prior art.

FIG. 1 depicts a multichannel, dense, 1xn WDM made according to silicon optical bench methods of the prior art. Components of this kind are described, for example in C. Dragone et al., "Efficient Multichannel Integrated Optics Star Coupler on Silicon", IEEE Photon. Technol. Lett. 3 (1991) 896–899. Free-space N×N star couplers, made using similar technology are described in C. Dragone, "Efficient N×N Star Couplers Using Fourier Optics", IEEE J. Lightwave Technol. 7 (1989) 479–489. Briefly the WDM of FIG. 1 is an interferometric device. In effect, two N×M couplers are interconnected by a plurality of waveguides 100 having different lengths. As a consequence, signals of various wavelengths that are input to the WDM on waveguide 110 are distributed to output waveguides 120 such that signals falling in different wavelength bands are distributed to different output waveguides. Illustratively, such a component can be used to multiplex signals in 16 or more different wavelength subchannels, with a subchannel separation of 1–2 nm cross-talk level of about −20 to −40 dB, and insertion loss of about 2.5 dB. The output wavelength bands are expected to exhibit some temperature gradient.

When the device is adversely affected by a temperature change, the central wavelengths that are separated and spread over a pick up region of a free-space region 170 become shifted such that, for example, $\lambda 1, \lambda 2, \ldots \lambda 16$ are not aligned with the designated pick-up or output waveguides 120. In this instance waveguides designed to couple with and receive particular wavelengths may couple with other wavelengths or may not couple with an intended wavelength efficiently. Or if the undesired wavelength shift is minor, crosstalk levels may exceed maximum allowable levels.

The WDM device as illustrated in FIG. 1 is a monolithic construction from input port 110 to outputs ports or locations 120. Alteration of the light travelling in the path by optical elements, such as lenses, gratings, filters, etc. is not practicable.

Figure 2:
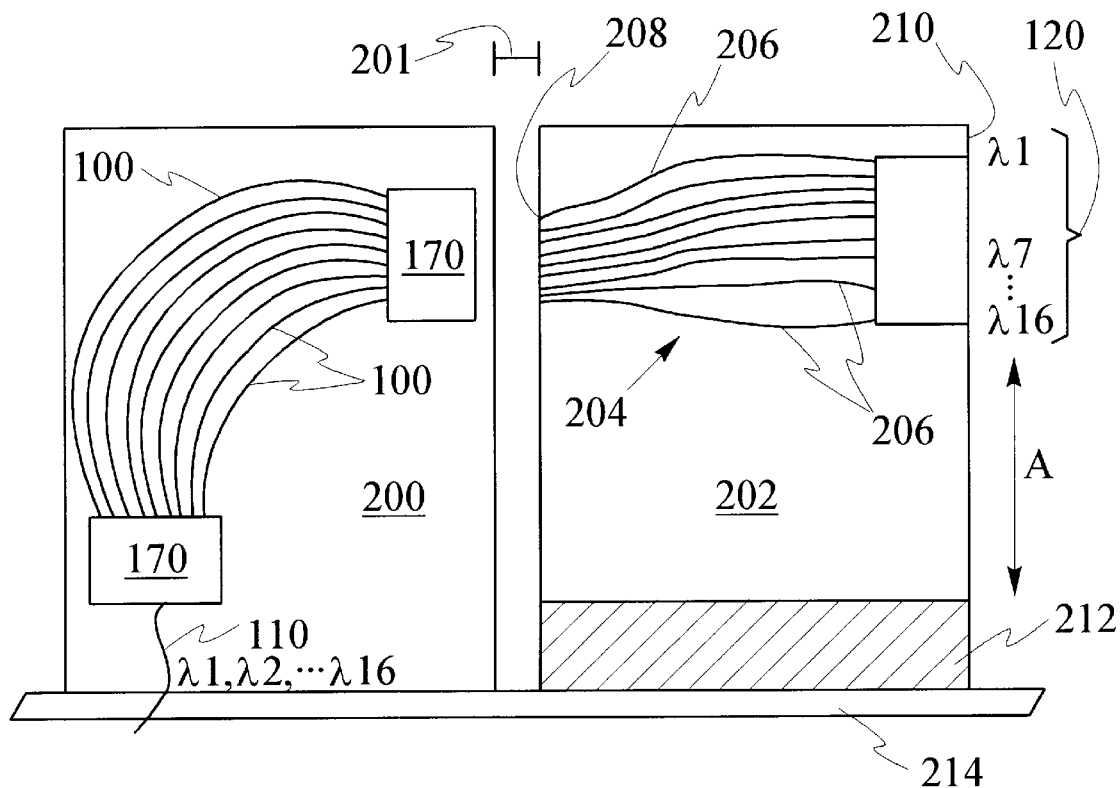
FIG. 2 is a schematic drawing of a multichannel WDM made in accordance with the invention.

Turning now to FIG. 2, a similar multichannel, dense, 1xn WDM is shown, wherein the monolithic waveguide block of FIG. 1 is separated into two waveguide blocks 200 and 202. Block 202 comprises a waveguide concentrator 204 having closely spaced waveguides 206 at a coupling end 208 for receiving/picking up separated sub-beams in separate designated waveguides 206 from the phased array demultiplexer (PAD) of waveguide block 200. The waveguide concentrator 204 guides the closely spaced separate sub-beams to spaced apart locations for coupling to individual fibers at an output end 210. Separation 201 between block 200 and block 202 permits the waveguide concentrator 204 to accommodate the wavelength shift induced by changing temperature, by shifting the position of the sub-beams, or by shifting the coupling ends of the waveguide concentrator 204. This relative shift between blocks 200 and 202 adjusts the physical alignment of the separated sub-beams and the waveguide concentrator 204 to match the physical shift of the sub-beams leaving the free space region 170 in response to changing temperature. Separation 201 may merely be sufficient to accommodate a coupling medium suitable for movement between the two blocks 200, 202, or may be dimensioned to incorporate additional optical elements. For example, in one preferred embodiment a collimating lens in the form of a GRIN lens may be placed in the gap between the two blocks coupled to the block 200 for example to lessen coupling losses between waveguides as light propagates across the gap.

The temperature compensation is effected in this embodiment by mounting the block 202 to a support 212 of different material having a selected coefficient of expansion for movement relative to the other block 200 in the directions of the phase shift, indicated by arrow A. Either block 200, 202 can be mounted to the expansion material 212 for movement relative to the other to cause a shift sufficient to realign the sub-beams to their designated waveguides 206 for proper coupling. Expansion material 212 is secured at an opposite side from the block 200 or 202 to a stable support 214. Likewise the opposite block is secured to the stable support 214, that relative movement is seen between the free space 170 and the waveguide concentrator 204.

Blocks 200, 202 may be formed as a single block and cut into separate elements to provide for phase shift between the free space region 170 and the waveguide concentrator 204. Alternatively, the blocks 200, 202 may be manufactured separately. Separation in the formerly monolithic structure offers the opportunity to insert additional optical elements. The monolithic construction of prior art devices has not permitted this type of correction.

A shift of the coupling connection between the free space region 170 and the waveguide concentrator 204 provides physical alignment of the separated sub-beams and the pickup waveguides 206 associated with each wavelength. The natural wavelength shift can be quantified by measuring the shift per degree. The effect is seen by a shift in the anticipated wavelength picked up by a designated waveguide 206 or by cross talk within one waveguide 206. The distance of this shift per degree represents the relative shift required per degree between the two blocks. A material with a high coefficient of expansion, a metal for example, is selected for its coefficient of expansion and the thickness is chosen to produce the shift per degree needed to compensate for the wavelength drift. A combination of materials can be used to obtain an expansion to match the wavelength shift. Using a temperature responsive expansion/contraction the shift is automatic, and the system is passive requiring no energy input.

As an example, a WDM for separating input light into sixteen channels having centre wavelengths separated by 100 Ghz or channels with an interchannel spacing of 20 $\mu$m for pickup by the waveguides of the waveguide concentrator. A shift of 1.4 Ghz/C.° requires an equal shift of 0.28 $\mu$m/C.° of the pickup waveguides. Selecting aluminum as an expansion material having a coefficient of expansion of $2.3\times10^5$/C.°, a thickness of 11.2 mm is required to provide the 0.28 $\mu$m/C.° shift.

Figure 3:
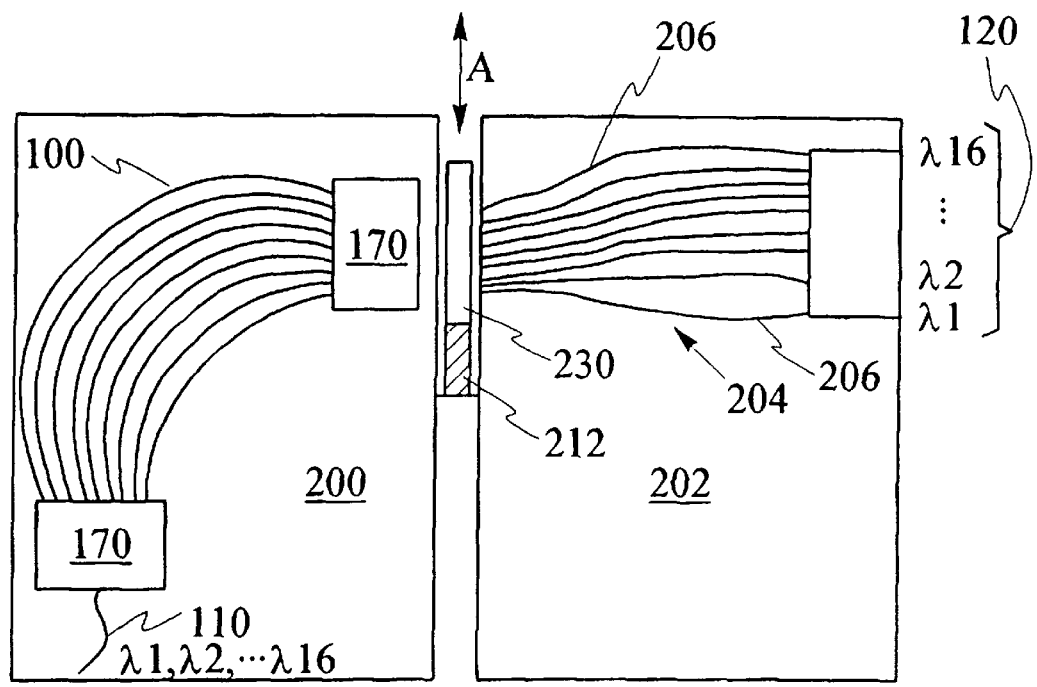
FIG. 3 is a schematic drawing of an alternative embodiment of the present invention depicting a moveable lens for providing temperature compensation within the demultiplexer; and, FIG. 4 is a schematic drawing of a further alternative embodiment of the present invention.

As seen in FIG. 3, a temperature compensation for the phase shift can also be made using a moveable 1:1 imaging lens 230 between the blocks 200, 202, such as a half pitch GRIN lens for displacing the sub-beams incident on it from the free space region 170 to facilitate the alignment for enhanced coupling to the waveguide concentrator 204. The movement preferably is again actuated by a passive thermal expansion element 212 fixed at one end relative to both block portions 200, 202. The lens 230 is abutted by the opposite end of the expansion element 212, and adapted for lateral movement as indicated by the arrow A. Advantageously, both waveguide portions 200, 202 remain stationary.

Figure 4:
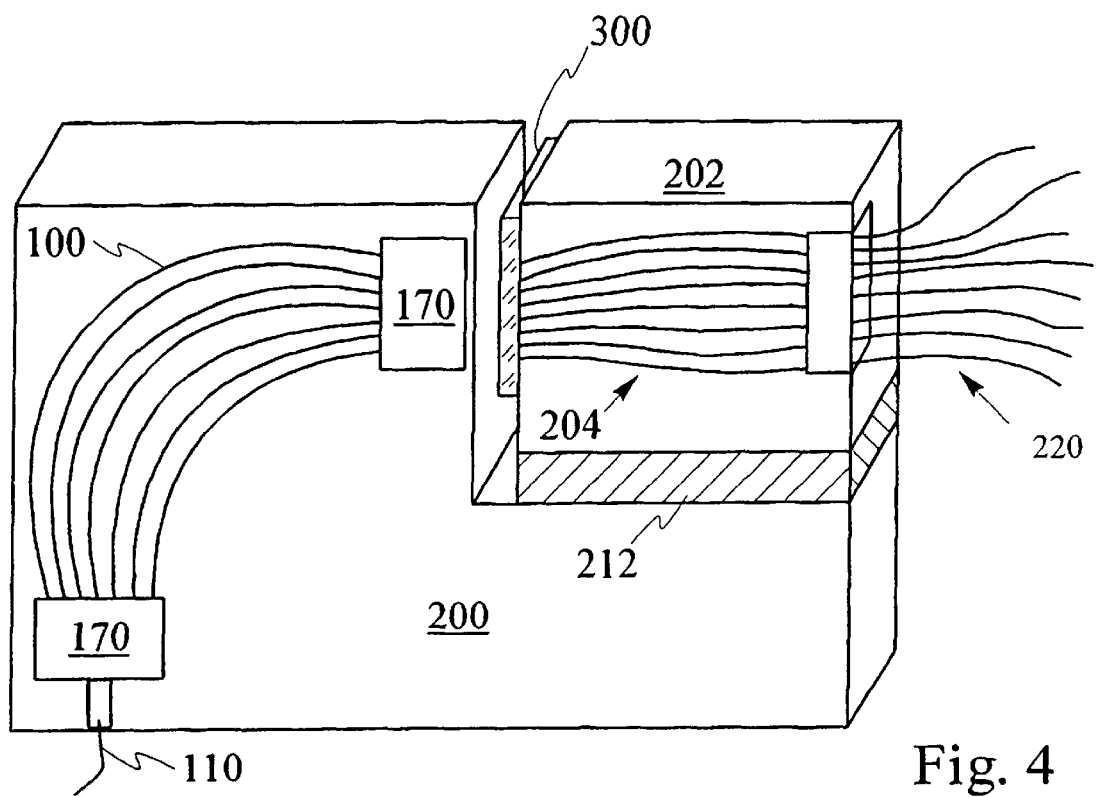

FIG. 4 illustrates an embodiment in which a section of the monolithic block 202 including the waveguide concentrator 204 is cut from the block 200 including the phased array. The expansion element 212 separates the block 202 from the block 200 to achieve relative movement between them without the need for a stable alignment support such as 214 in FIG. 2. One preferred embodiment includes an anisotropic material 300 for minimizing polarization dependent loss provided within the separation 201 between the coupling of the free space region 170 and the waveguide concentrator 204. If this anisotropic material 300 is provided at the centre of the waveguide array of the WDM, the effects of TE and TM polarization losses can be equalized. Other optical elements similarly can be positioned in the optical path in this way.

In operation, light inserted from waveguide 110 enters a first free space region 170 from which it is coupled to a plurality of waveguides 100 of different lengths. Light entering the second free space region 170 is separated by interference into sub-beams of separate wavelength. Individual waveguides 206 pickup the separated sub-beams and spread the separate channels to separate output fibers 220. As temperature changes affect the transmission and separation in the phased array, the sub-beams exiting the second free space region 170 experience a wavelength shift, physically shifting the position of the sub-beams exiting the free space region 170. Temperature change also affects the expansion element 212 causing it simultaneously to expand or contract, accordingly shifting the position of the waveguide concentrator 204 to perfect the alignment of the sub-beams and the waveguides 206.

Of course, the same phased array demultiplexer can also perform a multiplexing operation in the reverse direction, as is well known in the art.

Translational movement can also be effected dynamically using a piezo-electric transducer for a discreet shift, an induced thermal expansion for a graduated response, or other mechanical or optical displacement means, as will be apparent to persons of skill in the art. Numerous alternative embodiments will be apparent to persons of skill in the art without departing from the spirit and scope of the invention as defined in the claims attached.

What is claimed is:

1. An optical device comprising:
   a planar waveguide portion, and a second portion spaced from the planar waveguide portion by a gap to receive optical signals therefrom, said planar waveguide portion including:
      means integrated therein for separating an input beam into sub-beams having different central wavelengths;
      said second portion having a plurality of waveguides for receiving individual sub-beams of separated light and temperature compensation means associated therewith for enhancing the coupling of the optical signals having predetermined wavelengths provided by the waveguide portion with the designated waveguides of the second portion.

2. A device as defined in claim 1 wherein the first portion comprises a first monolithic waveguide block.

3. A device as defined in claim 2 wherein the second portion comprises a second monolithic waveguide block.

4. A device as defined in claim 3 wherein the temperature compensation means is for altering the position of the waveguides relative to the location of the sub-beams having predetermined wavelengths provided by the first block so as to enhance the coupling of the predetermined wavelengths of light at locations on the first block with and for reception by the designated waveguides on the second block.

5. A device as defined in claim 4 wherein the second monolithic waveguide block includes an optical concentrator comprising a plurality of optical waveguides spaced more closely at one end than at another end.

6. A device as defined in claim 4 wherein the temperature compensation means comprises means coupled with one of the first or second monolithic waveguide blocks for moving the waveguides relative to the location of the sub-beams in a direction that will enhance the coupling of the predetermined wavelengths of light provided by the first block with predetermined waveguides of the second block.

7. A device as defined in claim 6, wherein the temperature compensation means is passive.

8. A device as defined in claim 7, wherein the temperature compensation means comprises a block of material having a coefficient of expansion that will effect the waveguides to be laterally displaced with a change in temperature so that the waveguides follow a corresponding lateral displacement in location of the predetermined wavelengths due to a variation in temperature.

9. A device as defined in claim 8, wherein the block of material is coupled with the first monolithic waveguide block, the first monolithic block being adapted for movement relative to the second monolithic block.

10. A device as defined in claim 8, wherein the block of material is coupled with the second monolithic waveguide block, the second monolithic block being adapted for movement relative to the first monolithic block.

11. A device as defined in claim 7, wherein the temperature compensation means comprises a block of metallic material having a coefficient of expansion that will laterally displace the second monolithic waveguide with a change in temperature so that the waveguides follow a corresponding lateral displacement of the predetermined wavelengths due to a temperature change.

12. A device as defined in claim 3 wherein the temperature compensation means comprises optical in the gap between the first and second waveguide blocks for selectively redirecting the sub-beams having predetermined wavelengths from the first waveguide block for alignment with designated waveguides of the second waveguide block.

13. A device as defined in claim 12, wherein the optical means comprises a displacable lens.

14. A device as defined in claim 13, including passive displacement means for displacing the lens.

15. A device as defined in claim 14, wherein the passive displacement means comprises a block of material coupled to the lens having a coefficient of expansion that will displace the position of the lens relative to the first and second waveguide blocks.

16. A wavelength demultiplexing device comprising:
a first monolithic waveguide block, and a second monolithic waveguide block spaced from the first block to receive optical signals therefrom, said first monolithic waveguide block including:
means integrated therein for separating an input beam into sub-beams having different central wavelengths;
said second monolithic waveguide block having closely spaced waveguides for receiving predetermined wavelengths of light corresponding to at least some of the sub-beams of light, one of the second monolithic waveguide block and the first block having temperature compensation means coupled therewith for coupling the predetermined wavelengths of light (provided by) emanating from the first block with predetermined waveguides of the second monolithic waveguide block, such that each waveguide is for receiving a predetermined wavelength of light, said temperature compensation means for effecting a relative displacement between the 0 first and second waveguide blocks when the position of the sub-beams corresponding to the predetermined wavelengths of light changes with a change in temperature, to more efficiently couple the predetermined wavelengths of light with predetermined waveguides.

17. A device as defined in claim 16, wherein the temperature compensation means is coupled with the second monolithic block.

18. A device as defined in claim 17 wherein the temperature compensation means is passive.

19. A device as defined in claim 18 wherein the temperature compensation means is for providing a lateral shift of the closely spaced waveguides with a change in temperature.

20. A device as defined in claim 18 wherein the first monolithic block includes a phased array of waveguides and a transformation region where interference of light exiting the phased array of waveguides can interfere to provide predetermined wavelengths as the sub-beams.

21. A device as defined in claim 16, wherein the temperature compensation means comprises a block of material having a coefficient of expansion that will laterally displace one of the first and second blocks relataive to the other with a change in temperature so that the closely spaced waveguides and sub-beams corresponding to predetermined wavelengths of light follow a corresponding relative displacement in location due to a variation in temperature to preserve their alignment.

22. A device as defined in claim 21, wherein the block of material is coupled between the first and second blocks for effecting relative movement between them.

23. A device as defined in claim 1 wherein the passive temperature compensation means comprises a movable lens, for displacing the sub-beams incident thereon, at an output thereof, in accordance with a change in temperature.

24. A device as defined in claim 23 wherein the lens is a substantially 1:1 imaging lens.

25. A device as defined in claim 23 including passive means for moving said lens, said means being coupled with said lens, said means having a coefficient of expansion that will displace the lens coupled thereto with a change in temperature in such a manner as to enhance the alignment of the predetermined wavelengths of light with predetermined closely spaced waveguides with a change in temperature.

26. A device as defined in claim 4 further comprising a GRIN lens disposed between the first block and the second block for substantially collimating light propagating between the first and second block.

* * * * *

UNITED STATES PATENT AND TRADEMARK OFFICE
CERTIFICATE OF CORRECTION

PATENT NO. : 5,905,824
DATED : May 18, 1998
INVENTOR(S) : Delisle et al.

It is certified that error appears in the above-identified patent and that said Letters Patent is hereby corrected as shown below:

Column 2,
Line 56, after "disposed", insert

-- within the glass. However, one known problem with these devices is that a wavelength shift with a change in temperature occurs, and waveguides designed to couple with and receive particular wavelengths may couple with other wavelengths or may not couple with an intended wavelength efficiently.

It is an object of this invention, to compensate for shifts in wavelength caused by by a change in temperature. This solution requires little or no external power.
In accordance with this invention, a device is provided comprising:
a first monolithic waveguide block, and a second monolithic waveguide block spaced from the first block to receive optical signals therefrom, said first monolithic waveguide block including: means integrated threin for separating an input beam into sub-beams having different central wavelengths;
said second monolithic waveguide block having closely spaced waveguides for receiving predetermined wavelengths of light corresponding to at least some of the sub-beams of light, one of the second monolithic waveguide block and the first block having temperature compenstion means coupled therewith for coupling of the predetermined wavelengths of light provided by the first block with predetermined waveguides of the closely spaced waveguides, such that

UNITED STATES PATENT AND TRADEMARK OFFICE
CERTIFICATE OF CORRECTION

PATENT NO.   : 5,905,824
DATED        : May 18, 1998
INVENTOR(S)  : Delisle et al.

It is certified that error appears in the above-identified patent and that said Letters Patent is hereby corrected as shown below:

predetermined waveguides are for receiving predetermined wavelengths of light, said temperature compensation means for effecting a relative displacement between the closely spaced waveguides and the position of the sub-beams corresponding to the predetermined wavelengths of light changes with a change in temperature, to more efficiently couple the predetermined wavelengths of light with predetermined waveguides.

In accordance with the invention there is further provided, an optical device comprising: a waveguide portion, and a second portion spaced from the planar waveguide portion by a gap to receive optical signals therefrom, said planar waveguide portion including: --

Column 3,

Line 26, delete

"within the glass. However, one known problem with these devices is that a wavelength shift with a change in temperature occurs, and waveguides designed to couple with and and receive particular wavelengths may couple with other wavelengths or may not couple with an intended wavelength efficiently.

It is an object of this invention, to compensate for shifts in wavelength caused by a change in temperature. This solution requires little or no external power.

In accordance with this invention, a device is provided comprising:

a first monolithic waveguide block, and a second monolithic waveguide block spaced from the first block to receive optical signals therefrom, said first monolithic waveguide

UNITED STATES PATENT AND TRADEMARK OFFICE
CERTIFICATE OF CORRECTION

PATENT NO.    : 5,905,824
DATED         : May 18, 1998
INVENTOR(S)   : Delisle et al.

It is certified that error appears in the above-identified patent and that said Letters Patent is hereby corrected as shown below:

block including:

means integrated therein for separating an input beam into sub-beams having different central wavelengths;

said second monolithic waveguide block having closely spaced waveguides for receiving predetermined wavelengths of light corresponding to at leat some of the sub-beams of light, one of the second monolithic waveguide block and the first block having temperature compensation means coupled therewith for coupling of the predetermined wavelengths of light provided by the first block with predeter mined waveguides of the closely spaced waveguides, such that predetermined waveguides are for receiving predetermined wavelengths of light, said temperature compensation means for effecting a relative displacement between the closely spaced waveguides and the position of the sub-beams corresponding to the predetermined wavelengths of light and the position of the sub-beams corresponding to the predetermined wavelengths of light changes with a change in temperature, to more efficiently couple the predetermined wavelengths of light with predetermined waveguides.

UNITED STATES PATENT AND TRADEMARK OFFICE
CERTIFICATE OF CORRECTION

PATENT NO.    : 5,905,824
DATED         : May 18, 1998
INVENTOR(S)   : Delisle et al.

It is certified that error appears in the above-identified patent and that said Letters Patent is hereby corrected as shown below:

In accordance with the invention there is further provided, an optical device comprising: a planar waveguide portion, and a second portion spaced from the planar waveguide portion by a gap to receive optical signals therefrom, said planar waveguide portion including:"

Signed and Sealed this

Fourth Day of December, 2001

*Attest:*

*Attesting Officer*

NICHOLAS P. GODICI
*Acting Director of the United States Patent and Trademark Office*